J. Carhart,

Organ Bellows.

No. 372. Reissued June 24, 1856.

AM. PHOTO-LITHO. CO. N.Y. (OSBORNE'S PROCESS)

UNITED STATES PATENT OFFICE.

JEREMIAH CARHART, OF NEW YORK, N. Y.

IMPROVEMENT IN BELLOWS FOR MUSICAL INSTRUMENTS.

Specification forming part of Letters Patent No. 4,912, dated December 28, 1846; Reissue No. 372, dated June 24, 1856.

*To all whom it may concern:*

Be it known that I, JEREMIAH CARHART, of the city of New York, in the county of New York and State of New York, have invented new and useful Improvements in that Class of Musical Instruments called Melodeons, Seraphines, Æolian Attachments, &c.; and I do hereby declare that the following is a full, clear, and exact description of the principle or character which distinguishes them from all other things before known, and of the manner of making, constructing, and using the same, reference being had to the accompanying drawings, making a part of this specification, in which—

Figure 1:
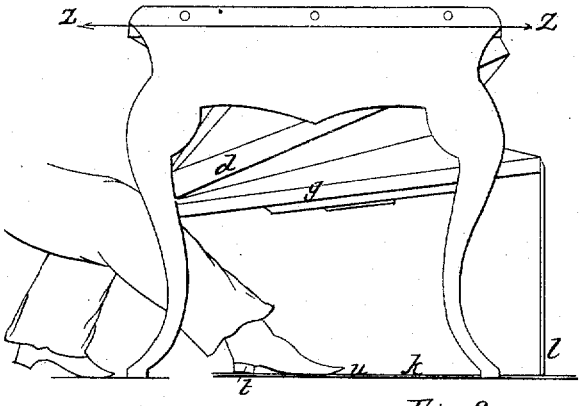
Figure 3:
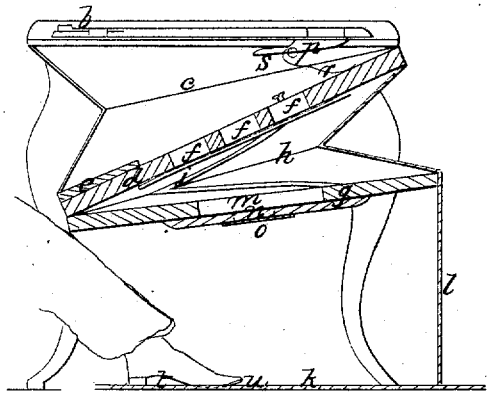
Figure 2:
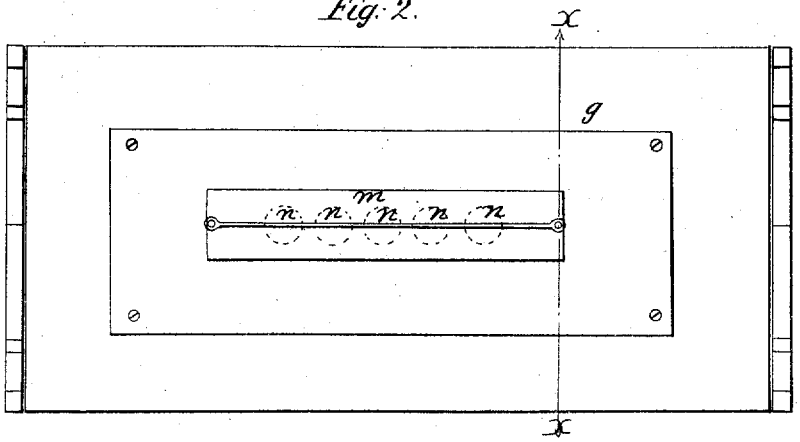
Figure 4:
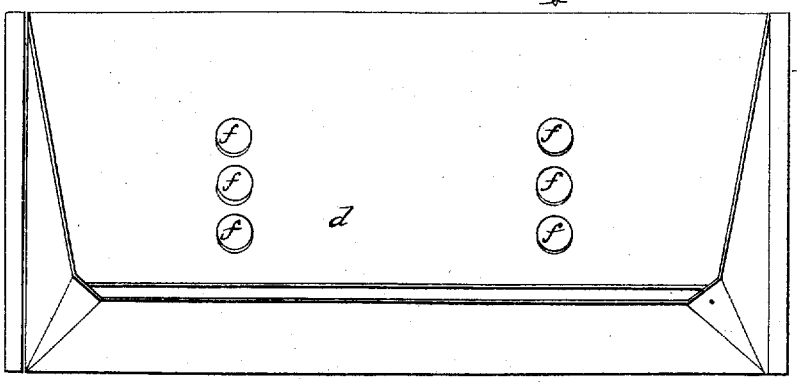

Figure 1 is an end elevation; Fig. 2, an inverted bottom view; Fig. 3, a vertical section taken at the line X X of Fig. 2, and Fig. 4 a horizontal section taken at the line Z Z of Fig. 1.

The same letters indicate like parts in all the figures.

Instruments of the kind above mentioned have prior to my invention had their reed-boards combined with double-chambered bellows whose parts were so constructed and arranged that the air was condensed within them by the action of the bellows, so as to cause the reeds to vibrate when the reed-valves were opened by the rushing of said condensed air out past and through the reeds into the atmosphere. On examination and experiment I found this mode of construction subject to many serious objections.

First. Unless the top of the instrument—the key-board—is permitted to be constantly vibrating as the bellows operates it requires a wind-chest, which makes it more cumbrous and expensive, and which must be capable of being opened, like the top of a piano-forte, and yet must be and remain, when closed, substantially air-tight. The latter quality it has constantly a tendency to lose more and more with time, in consequence of the outward pressure of the condensed air within.

Secondly. Under this construction all the joints of the entire instrument have a tendency to open and get out of repair, in consequence of the outward pressure of the condensed air.

Thirdly. With this mode of producing the current of air, the reeds, with the open plates to which they are attached, must be placed within the instrument, under the reed-board, so that in constructing the instrument, if found to operate imperfectly, they cannot be examined or taken out without opening the instrument, and as this stops the operation of the reeds they cannot be inspected while in place and in operation to detect the cause of their imperfect action preparatory to correction. The same difficulties also present themselves when repairs become necessary, and render the task one of great difficulty and perplexity.

Fourthly. The reed-valves, which are raised by the keys in playing to admit the air successively to the reeds, are under this construction pressed by the condensed air against the openings in which the reeds are placed with the full force of the condensation of the air within, thus rendering the fingering hard and difficult.

Fifthly. As the vibration of the reeds under the old construction is produced by currents from a small wind-chest, in which the air is kept in irregular agitation by constantly changing the point of discharge, and against the full pressure of the atmosphere, it is found that the reeds will not always "speak" or give forth their sounds sufficiently quick, and it is also found that the tone, when given out, is inferior.

The foregoing are some of the defects of the old construction of reed-instruments, and my improvements are made principally for the purpose of obviating them.

My invention consists, principally, in so constructing, combining, and arranging the parts of said reed-instruments that the reeds shall be vibrated in playing by the rushing of the external air inward to a partially-exhausted chamber, instead of forcing it outward, as previously practiced; and this I accomplish by placing the reeds on the outer or upper side of the reed-board, placing a chamber capable of expansion and contraction in communication with the under side of the reeds, said chamber having an aperture closed by a valve which opens outward into a second expanding and contracting chamber or air-pump, which also has an aperture closed by a valve opening outward. One of the flaps of the last-mentioned chamber is connected with a treadle, by which it is operated to expand and contract the chamber, by which means the first chamber is exhausted of its air by the pump. The latter operation may be aided by weights or springs, if desired; and the first chamber should be provided with a weight or some other equivalent operating constantly to distend it. I find six or eight pounds to the square foot of the flap to be preferable. By these improvements it is readily perceived that the "wind-chamber" or "wind-chest" is entirely dispensed with. As the air within is exhausted, the pressure of the air from without tends to tighten the seams of the instrument, rendering it more durable, and keeping it in repair and preventing leakage. The reeds are on the outside, so that any defect can be observed while the instrument is in operation, and can be removed for repair without opening the instrument. The reed-valves can be opened by the slightest touch of the keys. The reeds, having a supply of air direct from the atmosphere, will speak immediately, and the tone will be much improved, as will be observed on experiment, thus at once obviating the leading defects of the old construction.

I have also made an improvement in the valves of reed musical instruments.

In the accompanying drawings, *a* represents the sound board or table, to which the reeds *b b* are secured in any desired or well-known manner, with the reeds above, so that the tone shall be produced by currents passing toward the bellows. The reeds are placed over apertures in the sound-board, in the usual manner, leading to the first chamber, *c*, formed by the sound-board, and the first flap, *d*, which is jointed in any desired manner to the back of the sound-board, and connected to the ends and the front by means usually employed in connecting the flaps of bellows. The forward edge of this first flap has a weight, *e*, attached to it, which tends constantly to draw it down by an equal force to give an equal current of air, and therefore to produce a regular vibration of the reeds. This first flap is provided with two series of apertures, *f f*, covered by valves on the under side, made in manner to be hereinafter described. To the weighted edge of this first flap is jointed the second flap, *g*, the two being connected at the ends and back to form the second chamber, *h*, in the same manner as the first is connected with the sound-board; and these two flaps are drawn together by a spring, *i*, one leaf of which is secured to each of them, so that whenever the foot is removed from a treadle, *k*, connected with the second flap by a strap, *l*, this spring draws it right up against the first flap, by which action all the air previously contained in the second chamber is forced out through a valve, *m*; and when this flap is drawn down by the pressure of the foot on the treadle the air contained in the first chamber is exhausted therefrom; and as this process of exhaustion goes on the pressure of the atmosphere preponderates over the weight on the first flap and forces it up, so that when the second flap is relieved of the pressure of the foot the spring immediately begins to draw it up. This relieves the first flap of the pressure of the atmosphere, which acts on it by the intervention of the second flap jointed to it, whereupon the weight begins to descend to keep up the constant and steady action of the air on the reeds.

The manner in which the pressure of the atmosphere acts to force up the first flap, when the first chamber is partly exhausted, will be evident when it is observed that the second flap is drawn down by one edge, the other being jointed to the front edge of the first flap, so that the pressure of the atmosphere on the under side of the second flap tends to force up the two flaps, notwithstanding the back of the lower one is carried down by the treadle, the connection of the treadle acting merely as a movable fulcrum for the upward movement of the front of the two flaps when forced up by the pressure of the atmosphere. The valves of the two flaps are formed by a strip of thin leather or other like material secured at each end over a hole or series of holes, *n*, (shown by dotted lines in Fig. 2,) and then over this leather is stretched a strip or cord, *o*, of india rubber or other similarly elastic substance, which permits the leather to open sufficiently for the passage of the air, but which at the same time prevents the leather from sagging down so far as to flap and make a noise when suddenly closed by the pressure of the air, as would be the case after being in use for a short time without the spring. The upper or first chamber is provided with an escape hinge-valve, *p*, opening inward, and kept closed by a spring, *r*, but which is opened by the upper or first flap striking the lever *s* of the valve when the operator works the lower or second flap faster than is necessary. The treadle *k*, which cannot be attached to the floor conveniently, is cut out, as at *t*, as represented by dotted lines in Figs. 1 and 3, sufficiently to permit the heel of the operator's foot to pass through and rest on the floor, to prevent the treadle from being pushed forward when the forward part of the foot acts on the part *u* to bear it down.

It will be obvious that other kinds of valves may be substituted for those described without changing the leading part of my invention, and that any other appropriate spring may be employed to draw together the two flaps, and, finally, that any desired mode of connecting the various parts may be employed, so long as the character of my invention or any part of it is retained.

It is obvious that many changes in form and in the mere arrangement of parts may be made without departing in the least from the principle of my invention, so long as the exhaust-chamber communicates with the reeds, and the second chamber or pump exhausts the first.

BEST AVAILABLE COPY

Having thus fully explained the nature of my improvements in reed musical instruments, and pointed out several modes in which I have contemplated the application thereof practically, what I claim as new therein and my own invention, and desire to secure by Letters Patent, is—

The combination of the reeds with an exhaust-chamber of variable capacity, and an air-pump whose action exhausts and rarefies the air therein, the exhaust-chamber tending to expand with a force that will balance the rarefaction to be preserved in the chamber, for the purposes herein set forth.

J. CARHART.

Witnesses:
SAM. C. SWARTZ.
WM. DIXEY,
JOHN J. MURRAY.